United States Patent
Lee et al.

(10) Patent No.: US 7,403,247 B2
(45) Date of Patent: Jul. 22, 2008

(54) POLARIZER FOR COMPENSATION OF GRAVITY DEFECT IN LIQUID CRYSTAL DISPLAY DEVICE

(75) Inventors: Su Woong Lee, Kumi-shi (KR); Mon Soo Kang, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 272 days.

(21) Appl. No.: 11/289,504

(22) Filed: Nov. 30, 2005

(65) Prior Publication Data

US 2006/0139533 A1  Jun. 29, 2006

(30) Foreign Application Priority Data

Dec. 29, 2004  (KR) .............. 10-2004-0115539

(51) Int. Cl.
*G02F 1/1335* (2006.01)
*G02F 1/1339* (2006.01)

(52) U.S. Cl. .............. 349/117; 349/96; 349/155

(58) Field of Classification Search ............. 349/96, 349/117, 155
See application file for complete search history.

(56) References Cited

U.S. PATENT DOCUMENTS

| 2005/0099563 A1 * | 5/2005 | Hsu et al. ............ 349/119 |
| 2005/0219454 A1 * | 10/2005 | Lee .................... 349/153 |
| 2006/0158586 A1 * | 7/2006 | Bruinink et al. ...... 349/114 |
| 2006/0203158 A1 * | 9/2006 | Parri et al. ........... 349/117 |

* cited by examiner

*Primary Examiner*—Frank G Font
*Assistant Examiner*—Jerry Blevins
(74) *Attorney, Agent, or Firm*—McKenna Long & Aldridge LLP

(57) ABSTRACT

An LCD device is disclosed, having a polarizer of which a retardation value is variable on regions for compensation of gravity defect caused by an excess liquid crystal at room temperature, wherein the LCD device includes an LCD panel having a normal cell gap region and an abnormal cell gap region; and the polarizer having a compensated retardation value Δnd for the abnormal cell gap region.

6 Claims, 8 Drawing Sheets

POLARIZER FOR COMPENSATION OF GRAVITY DEFECT IN LIQUID CRYSTAL DISPLAY DEVICE

This application claims the benefit of the Korean Patent Application No. P2004-115539, filed on, Dec. 29, 2004, which is hereby incorporated by reference as if fully set forth herein.

BACKGROUND OF THE INVENTION

1. Field of the Invention

The present invention relates to a liquid crystal display (LCD) device, and more particularly, to an LCD device including a polarizer of which a retardation value is variable on regions for compensation of gravity defect caused by an excess liquid crystal at room temperature.

2. Discussion of the Related Art

Demands for various display devices have increased with development of an information society. Accordingly, many efforts have been made to research and develop various flat display devices such as liquid crystal display (LCD), plasma display panel (PDP), electroluminescent display (ELD), and vacuum fluorescent display (VFD). Some species of flat display devices have already been applied to displays for various equipments.

Among the various flat display devices, liquid crystal display (LCD) devices have been most widely used due to their advantageous characteristics of a thin profile, light weight, and low power consumption, whereby the LCD devices provide a substitute for a Cathode Ray Tube (CRT). In addition to mobile type LCD devices such as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, lacking as compared to other features and advantages of the LCD device. In order to use LCD devices in various environments as a general purpose display, the key to developing LCD devices depends on whether LCD devices can implement a high quality picture, such as high resolution and high luminance with a large-sized screen, while still maintaining lightness in weight, thin profile, and low power consumption.

Hereinafter, a related art LCD device and a problem of gravity defect therein will be described with reference to the accompanying drawings.

Figure 1:
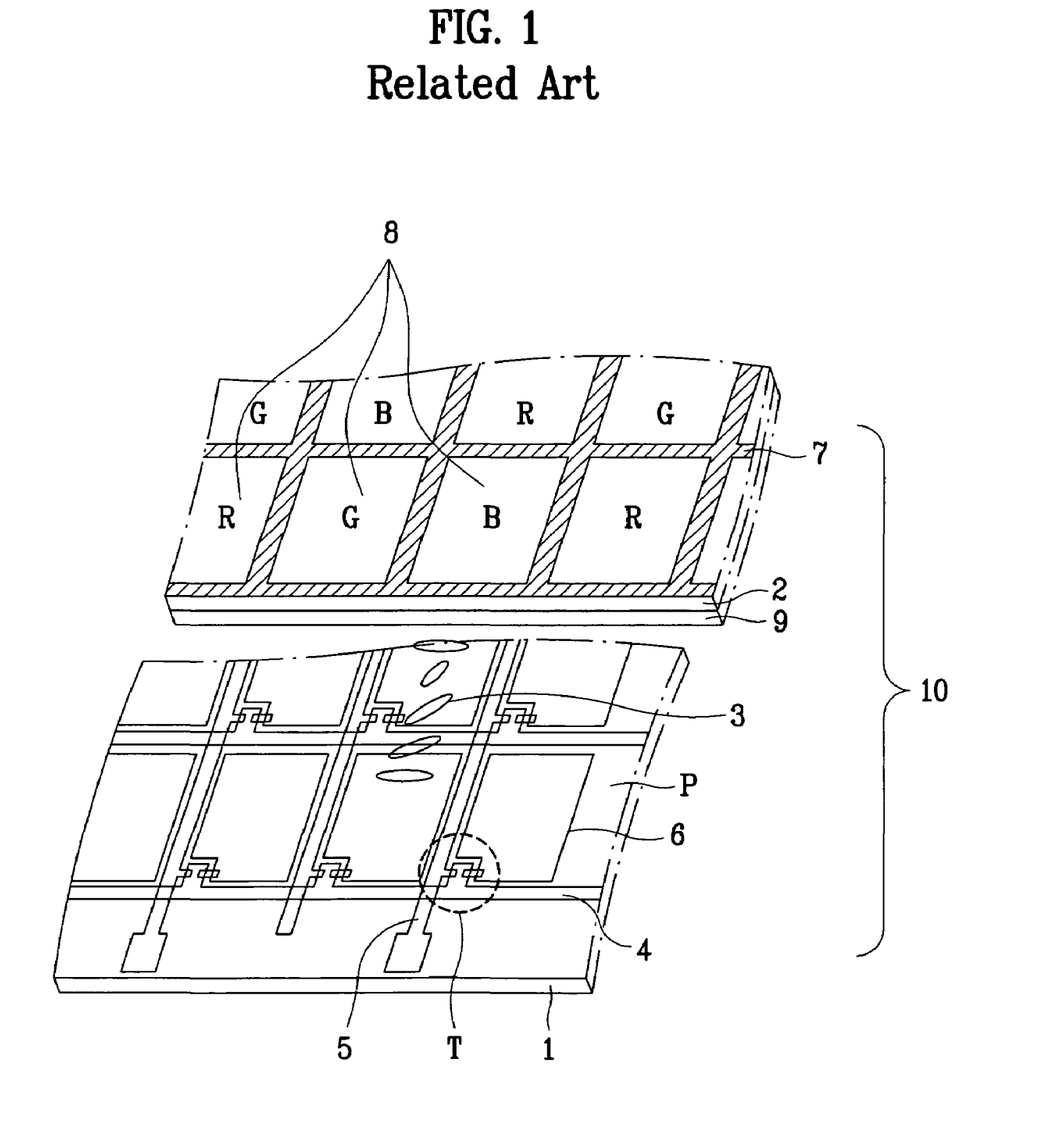
FIG. 1 is an exploded perspective view illustrating an LCD device according to the related art.

FIG. 1 is an exploded perspective view illustrating an LCD device according to the related art. As illustrated in FIG. 1, a related art LCD device includes first and second substrates 1 and 2 bonded to each other at a predetermined interval, and a liquid crystal layer 3 formed between the first and second substrates 1 and 2.

In more detail, the first substrate 1 includes a plurality of gate and data lines 4 and 5, a plurality of pixel electrodes 6, and a plurality of thin film transistors T. The plurality of gate lines 4 are formed on the first substrate 1 at fixed intervals, and the plurality of data lines 5 are formed in perpendicular to the plurality of gate lines 4 at fixed intervals. Then, the plurality of pixel electrodes 6, which are arranged in a matrix-type configuration, are respectively formed in pixel regions defined by the plurality of gate and data lines crossing each other. The plurality of thin film transistors T are switched according to signals of the gate lines for transmitting signals of the data lines to the respective pixel electrodes.

The second substrate 2 includes a black matrix layer 7 that excludes light from regions except the pixel regions P of the first substrate, R/G/B color filter layer 8 displaying various colors in correspondence with the pixel regions, and a common electrode 9 to obtain the picture image.

Then, the liquid crystal layer 3 is formed between the first and second substrates 1 and 2. The LCD device is driven according to an electric field generated between the pixel electrode 6 and the common electrode 9. Thus, it is possible to control the amount of light passing through the liquid crystal layer 3 according to the alignment of liquid crystal layer 3, thereby displaying the images.

This is referred to as a TN (Twisted Nematic) mode, which has the disadvantage of a narrow viewing angle. In order to overcome the disadvantage of the TN mode LCD device, an IPS (In-Plane Switching) mode LCD device has been developed and studied.

In case of the IPS mode LCD device, both pixel and common electrodes are formed at a predetermined interval in a pixel region of a first substrate, thereby generating an IPS mode electric field (transverse electric field). That is, a liquid crystal layer is driven with the transverse electric field.

In the meantime, a method for fabricating an LCD device is classified into a liquid crystal dropping method and a liquid crystal injection method according to a type of forming a liquid crystal layer between first and second substrates.

The liquid crystal injection method will be described in brief.

First, a container of receiving a liquid crystal material and an LCD panel are positioned inside a chamber. According as the chamber is maintained under a predetermined pressure, moisture and foam is removed from the liquid crystal material and the inner walls of the container, and the inner space of the LCD panel is made to a vacuum state.

A liquid crystal inlet of the LCD panel is dipped into the liquid crystal material of the container under the vacuum state, and then the pressure inside the chamber is made to an atmospheric pressure. Thus, the liquid crystal material is injected to the inside of the LCD panel through the liquid crystal inlet by the pressure difference between the inside of the LCD panel and the chamber.

A method for fabricating an LCD device by the liquid crystal injection method has the following disadvantages. After cutting the two substrates into unit LCD panels, the vacuum state is maintained between the two substrates. In this state, the liquid crystal inlet is dipped into the container of the liquid crystal material. Thus, it requires a long time to inject liquid crystal, thereby lowering the manufacturing yield.

Also, when forming the large-sized LCD device, it is impossible to completely inject the liquid crystal material to the inside of the LCD panel, thereby causing the defects.

Further, the liquid crystal injection method requires a complicated process and spends a long time. That is, it is necessary to provide several equipments for injection of liquid crystal, thereby requiring a large space.

To overcome these problems of the liquid crystal injection method, the liquid crystal dropping method is developed, in which liquid crystal is dropped on any one of two substrates, and the two substrates are bonded to each other. In the liquid crystal dropping method, before bonding the two substrates to each other, the appropriate amount of liquid crystal is dropped on any one of the two substrates. After completing the dropping of liquid crystal, the two substrates are bonded to each other.

Figure 2:
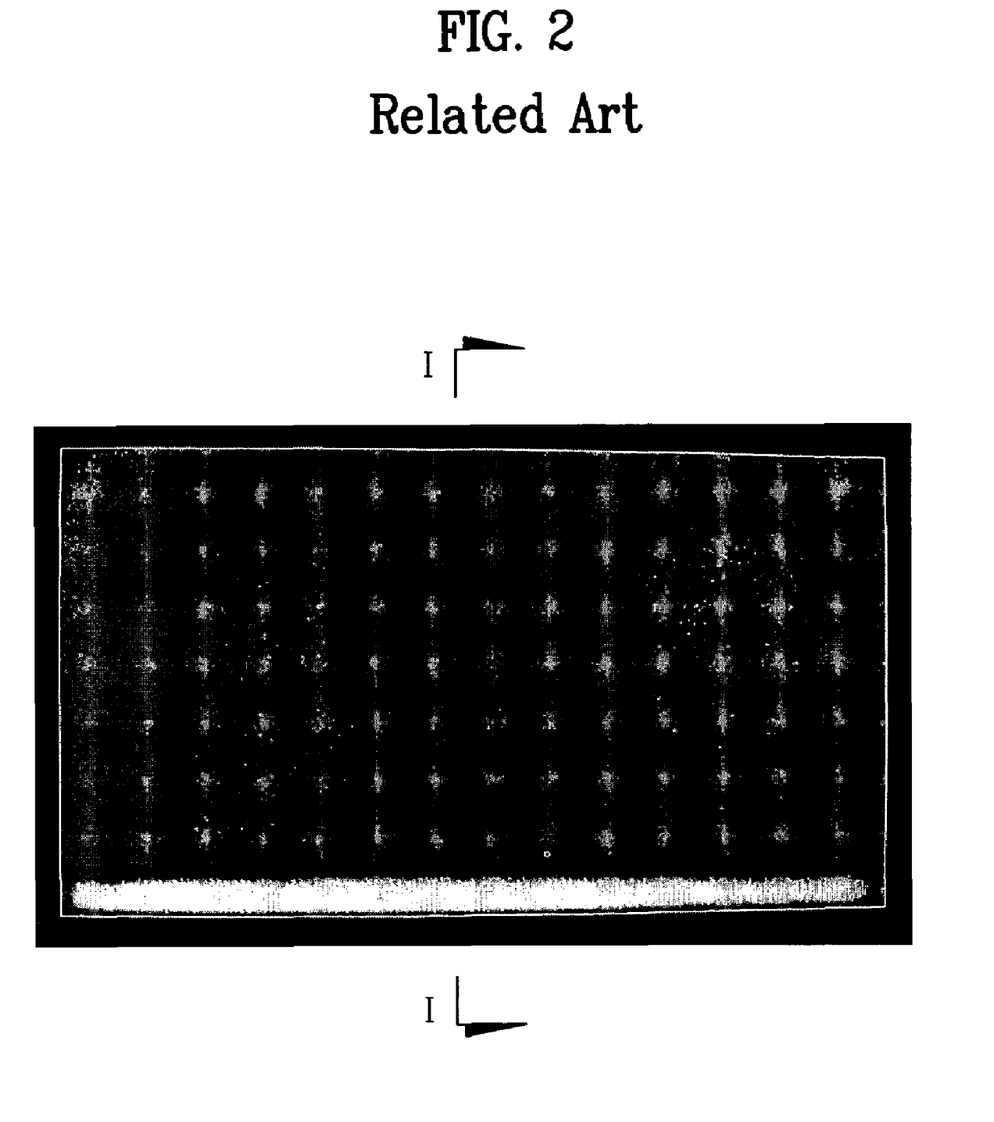
FIG. 2 is a photograph illustrating a gravity defect in an LCD device according to the related art.
Figure 3:
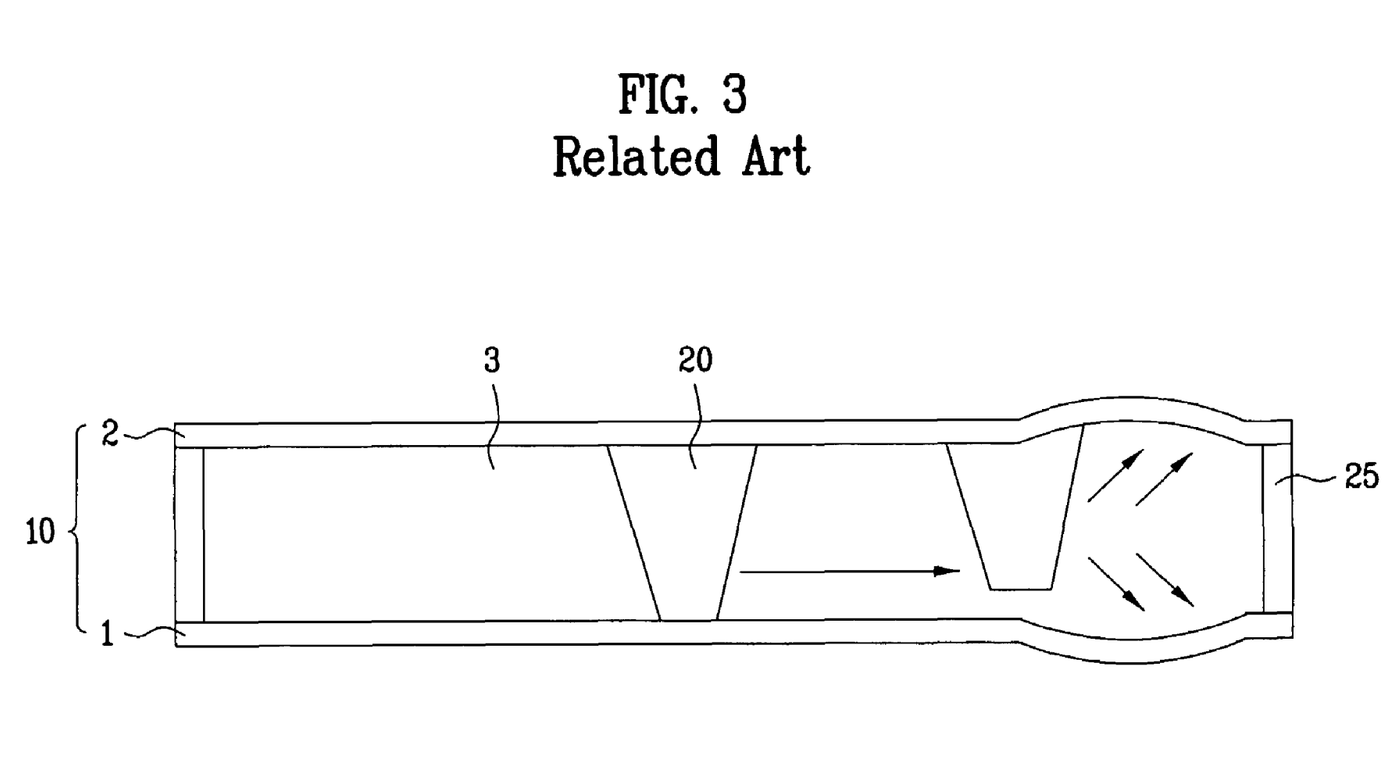
FIG. 3 is a cross sectional view along line I-I' of FIG. 2.

FIG. 2 is a photograph illustrating a gravity defect in an LCD device according to the related art. FIG. 3 is a cross sectional view along I-I' of FIG. 2.

Referring to FIG. 2, the gravity defect generates in a lower edge of the LCD panel which is adjacent to the ground. When the LCD panel stands vertically, liquid crystal flows downward by gravity. Thus, the lower edge of the LCD panel is swollen, whereby a cell gap corresponding to the lower edge of the LCD panel increases, thereby generating spots.

As illustrated in FIG. 3, when cutting the LCD panel 10, a column spacer 20 may be apart from the first substrate 1 due to the swollen liquid crystal in the lower edge of the LCD panel 10. Especially, if the LCD panel 10 stands vertically when providing the excessive amount of liquid crystal, the liquid crystal flows to the lower edge of the LCD panel which is adjacent to the ground, whereby the lower edge of the LCD panel is relatively swollen.

At this time, a sealant pattern 25 is formed in a peripheral region of the LCD panel 10, and then the first and second substrates 1 and 2 are bonded to each other by the sealant pattern 25. In this case, a liquid crystal layer 3 is formed with the liquid crystal dropped between the first and second substrates 1 and 2. In the liquid crystal layer 3, a cell gap in the portion having no gravity defect is different from a cell gap in the portion having the gravity defect. When driving the LCD device, the portion having the gravity defect is displayed as a blurred image.

Figure 4:
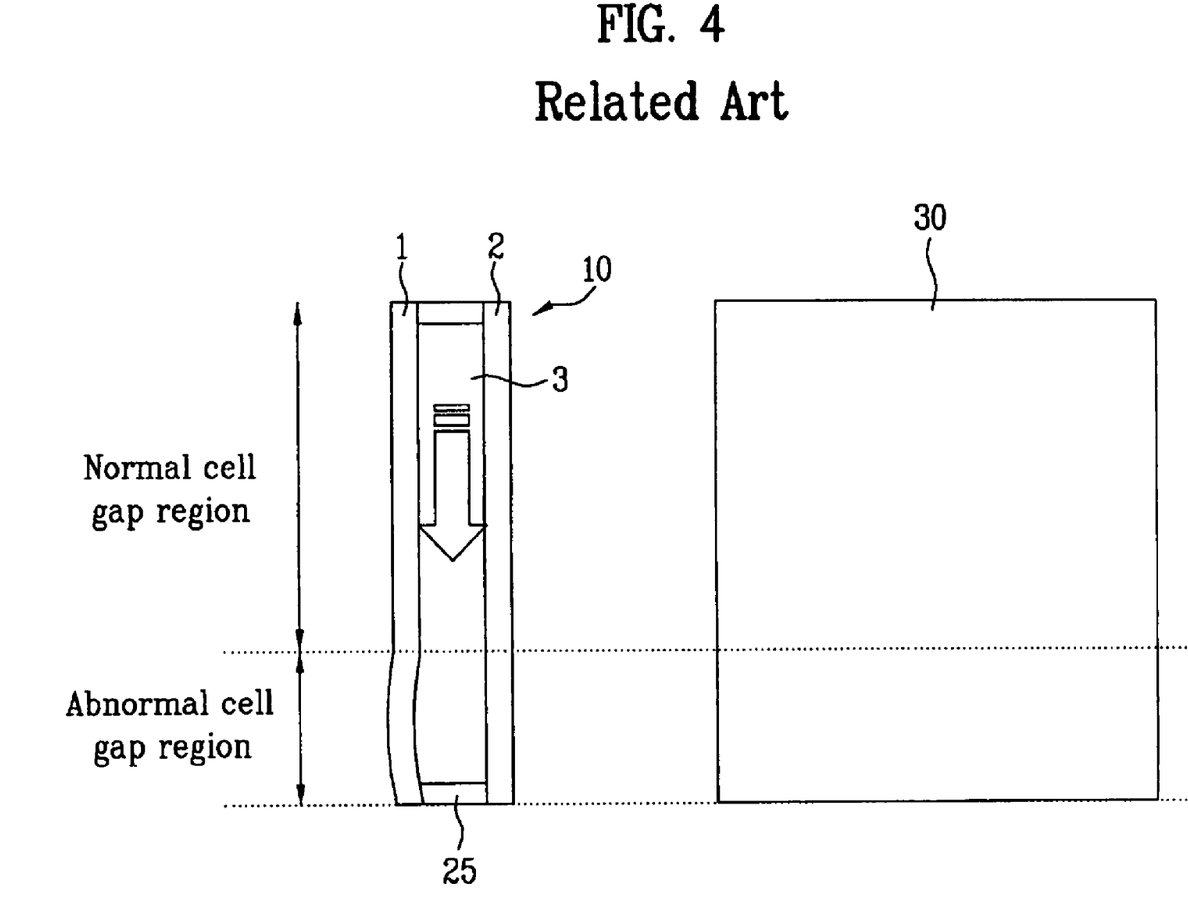
FIG. 4 is a view illustrating a polarizer corresponding to an LCD panel according to the related art.

FIG. 4 is a view illustrating a polarizer corresponding to the LCD panel according to the related art. Referring to FIG. 4, the polarizer 30 corresponding to the LCD panel has the same retardation value Δnd on the entire surface.

When the LCD panel stands vertically, the liquid crystal flows down. Thus, the lower edge of the LCD panel swells, which is displayed as the blurred portion, thereby deteriorating the picture quality. The gravity defect is generated when the liquid crystal is excessively dropped on the substrate. Even though the LCD panel is maintained at room temperature or high temperature, the gravity defect may nonetheless be generated.

Thus, as an example, the related art LCD device has the disadvantage of when the LCD panel stands vertically after excessive dropping of the liquid crystal on the substrate, the liquid crystal flows downward, whereby the lower edge of the LCD panel becomes swollen, which is referred to as the gravity defect. In this case, the LCD panel having the gravity defect may result in a blurred image, lowering the picture quality.

SUMMARY OF THE INVENTION

Accordingly, the present invention is directed to an LCD device that substantially obviates one or more problems due to limitations and disadvantages of the related art.

An advantage of the present invention is to provide an LCD device including a polarizer of which a retardation value is variable on regions for compensation of gravity defect caused by an excess liquid crystal at room temperature.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device includes an LCD panel having a normal cell gap region and an abnormal cell gap region; and a polarizer having a compensated retardation value Δnd for the abnormal cell gap region. The retardation value varies with the cell gap.

Also, the abnormal cell gap region described here is one caused by or induced by a gravity defect. In addition, the polarizer has a relatively smaller retardation value in the portion corresponding to the abnormal cell gap region than the remaining portions corresponding to the normal cell gap region.

Further, the polarizer is adhered to a lower or upper side of the LCD panel, and includes a PVA layer, a first TAC layer on the PVA layer, a second TAC layer under the PVA layer, and an LC layer under the second TAC layer.

In addition, the LC layer is formed of discotic liquid crystal. The LC layer corresponding to the portion having the gravity defect linearly decreases in thickness from 0 to 0.5 and from 1 to 0.5 when an edge of the LCD panel is '0' and an end of finishing the gravity defect is '1'.

Also, the retardation value corresponding to the abnormal cell gap region is controlled with the change in thickness of the LC layer.

Further, the LCD panel includes first and second substrates positioned in opposite to each other; a sealant pattern, provided in a peripheral region, for bonding the first and second substrates to each other; and a liquid crystal layer formed between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 5:
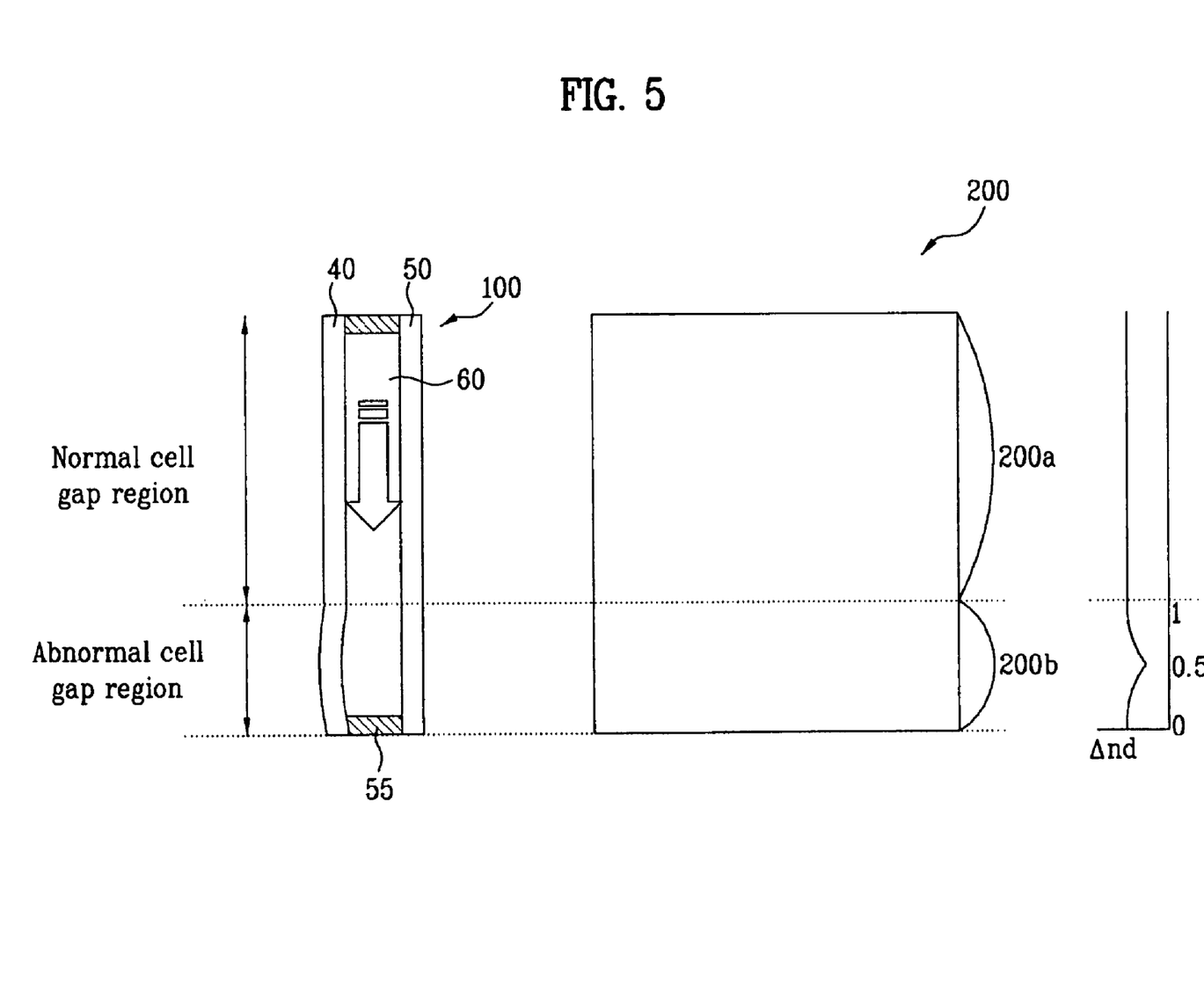
FIG. 5 is a view illustrating a polarizer corresponding to an LCD panel and a change of retardation in an LCD device according to the present invention.
Figure 6:
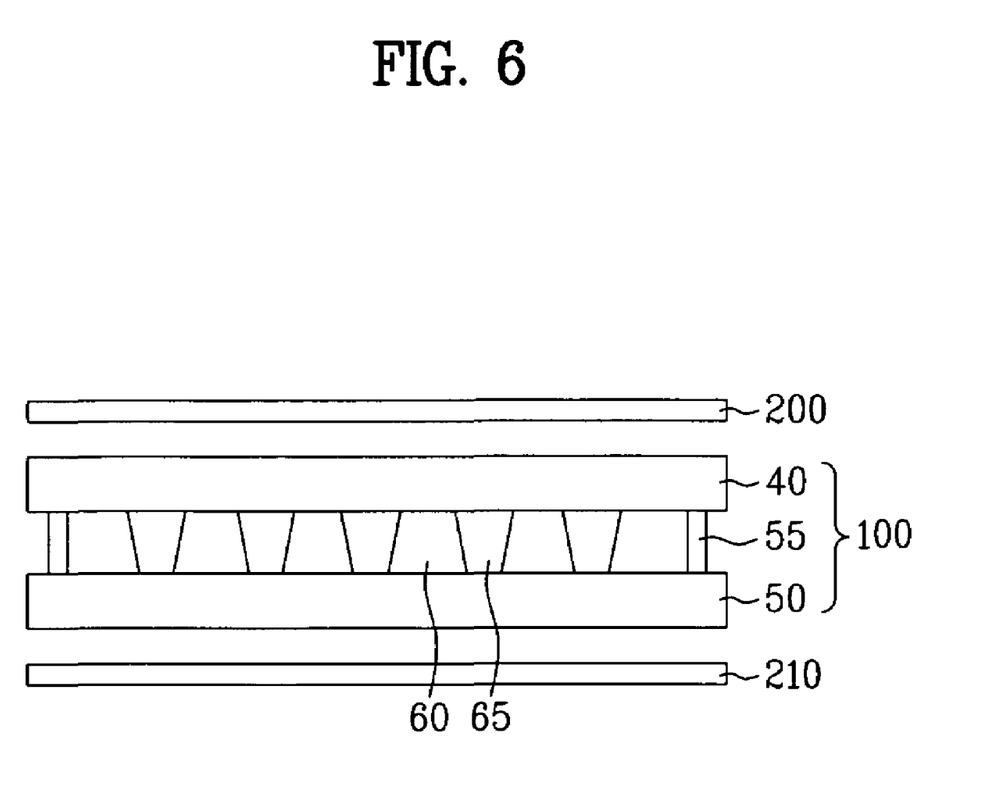
FIG. 6 is a cross sectional view illustrating an LCD device according to the present invention.
Figure 7:
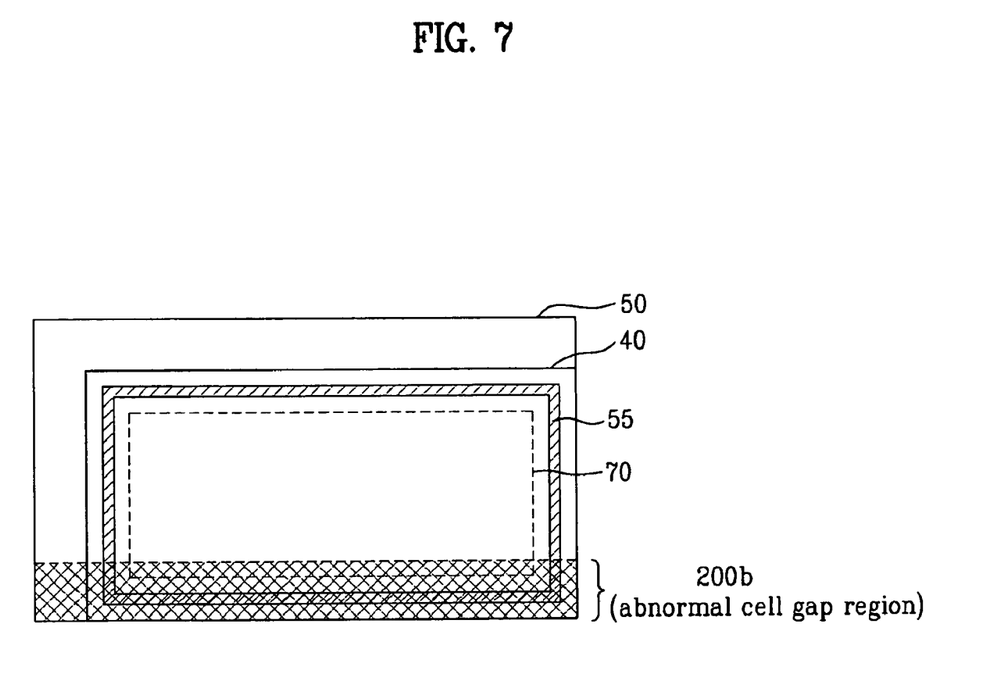
FIG. 7 is a plane view illustrating an LCD device according to the present invention.

FIG. 5 is a view illustrating a polarizer corresponding to an LCD panel and a change of retardation in an LCD device according to the present invention. FIG. 6 is a cross sectional view illustrating an LCD device according to the present invention. FIG. 7 is a plane view illustrating an LCD device according to the present invention.

In an LCD device according to the present invention, as illustrated in FIGS. 5 to 7, a polarizer is provided in due consideration of that a predetermined portion having a gravity defect has a larger cell gap than the remaining portions.

When the gravity defect generates, the predetermined portion corresponding to the gravity defect is swollen. As a result, a cell gap in the predetermined portion having the gravity defect is larger than a normal cell gap in the remaining portion.

The gravity defect may generate when the excessive amount of liquid crystal is provided to the LCD panel or the LCD panel stands vertically. In this case, the excess liquid crystal flows down.

The LCD panel 100 of the LCD device according to the present invention is provided with first and second substrates 40 and 50 being positioned in opposite to each other, a sealant pattern 55, and a liquid crystal layer 60. The sealant pattern 55 is formed in correspondence with a peripheral region of the first and second substrates 40 and 50, and the liquid crystal layer 60 is formed between the first and second substrates 40 and 50.

In the LCD panel according to the present invention, a retardation value $\Delta nd$ of a polarizer is variable according to a change of a cell gap in the LCD panel 100, thereby compensating a difference of cell gap.

For example, a lower side of the LCD panel 100 is swollen due to the gravity defect, whereby the corresponding cell gap d of the liquid crystal layer increases. In the polarizer 200, the retardation value $\Delta nd$ corresponding to the portion having the gravity defect is lowered relatively. On the assumption that the polarizer is adhered to the LCD panel, a viewer can feel the same retardation value from the respective portions (normal cell gap portion and larger cell gap portion). That is, the liquid crystal layer of the LCD panel is filled with liquid crystal of the same material in the areas corresponding to the normal cell gap portion and the larger cell gap portion, whereby it has the same anisotropic refractivity $\Delta n$. The retardation value of the respective portions (normal cell gap portion and larger cell gap portion) of the liquid crystal layer is changed according to the cell gap value. In the LCD device according to the present invention, the retardation value of the polarizer is controlled in inverse relation to the cell gap value of the liquid crystal layer. Thus, when the viewer watches the LCD panel to which the polarizer is adhered, the same retardation value is obtained in the normal cell gap portion and the larger cell gap portion, thereby improving the picture quality.

As illustrated in FIG. 5, a first area 200a of the polarizer 200, which corresponds to the normal cell gap portion, has the same retardation value. In a second area 200b of the polarizer 200 which corresponds to the larger cell gap portion, the retardation value is changed. When an edge of the LCD panel 100 is '0', an end of the gravity defect is '1', and the center in the portion having the gravity defect is '0.5', the second area 200b has the smallest retardation value in correspondence with the region of '0.5'. Going from the region of '0.5' to the region of '1', and going from the region of '0.5' to the region of '0', the retardation value increases linearly. In this case, the retardation value in the regions of '1' and '0' is same as the retardation value of the first area.

As illustrated in FIG. 6, column spacers 65 are formed at fixed intervals, wherein the column spacers 65 are positioned in the liquid crystal layer 60 between the first and second substrates 40 and 50.

FIG. 7 illustrates the correspondence of the first and second substrates for the LCD panel and a sealant formation part of the LCD device. In FIG. 7, the polarizer is not illustrated. In this case, when the LCD panel stands vertically, a gravity defect generates in the lower side of the LCD panel, and the second area 200b of the polarizer is defined in correspondence with the lower side of the LCD panel. At this time, an area defined with a dotted line inside a sealant pattern 55 corresponds to a display area 70. Also, a peripheral area corresponds to a non-display area. In this case, the second area 200b of the polarizer may be formed in the inside of the display area 70.

Figure 8:
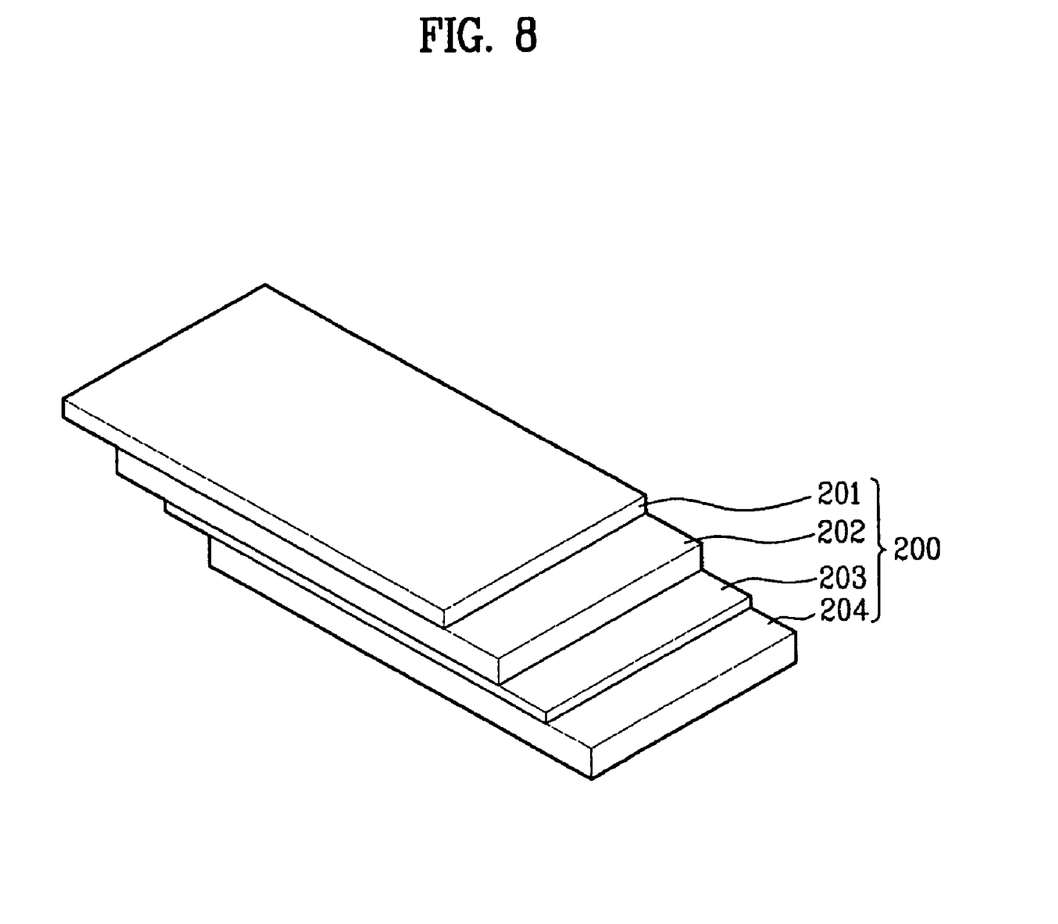
FIG. 8 is an exploded perspective view illustrating a polarizer in an LCD device according to the present invention.

FIG. 8 is an exploded perspective view illustrating the polarizer of the LCD device according to the present invention. Referring to FIG. 8, the polarizer 200 of the LCD device according to the present invention is comprised of a PVA (Poly Vinyl Alcohol) layer, a first TAC (Tri-Acetyl Acetate) layer on the PVA layer, a second TAC layer under the PVA layer, and a DLC (Discotic Liquid Crystal) layer under the second TAC layer. The DLC layer compensates for the retardation value.

The PVA layer is an optical film formed by arranging iodine or two-color dye. The first and second TAC layers are transparent passivation films. The DLC layer has a changed thickness in the second area 200b so as to control the retardation layer.

In the LCD device according to the present invention, the LCD panel having the gravity defect corresponds with the polarizer having the controlled retardation value. Thus, even though the gravity defect generates, it is possible to compensate for the gravity defect with the polarizer.

As mentioned above, the LCD device according to the present invention has the following advantages.

The LCD device according to the present invention uses the polarizer which slowly changes the retardation value in correspondence with the portion having the gravity defect, thereby improving the picture quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
    an LCD panel having a normal cell gap region and an abnormal cell gap region; and
    a polarizer having a compensated retardation value $\Delta nd$ for the abnormal cell gap region, said compensated retardation value for the abnormal cell gap region being different than a compensated retardation value for the normal cell gap region,
    wherein the abnormal cell gap region is induced by a gravity defect and
    wherein the polarizer includes a PVA layer, a first TAC layer on the PVA layer, a second TAC layer under the PVA layer, and a discotic liquid crystal layer under the second TAC layer and thickness of the discotic liquid crystal layer corresponding to the abnormal cell gap region linearly decreases from an edge line of the LCD panel to a middle line of the abnormal cell gap region, and from an end of finishing line of the abnormal cell gap to the middle line of the abnormal cell gap region.

2. The LCD device of claim 1, wherein the retardation value is changed with variation of the cell gap.

3. The LCD device of claim 1, wherein the polarizer has a relatively smaller retardation value in the portion corresponding to the abnormal cell gap region than the remaining portions corresponding to the normal cell gap region.

4. The LCD device of claim 1, wherein the polarizer is adhered to a lower or upper side of the LCD panel.

5. The LCD device of claim 1, wherein the retardation value corresponding to the abnormal cell gap region is controlled with the change in thickness of the LC layer.

6. The LCD device of claim 1, wherein the LCD panel includes:

first and second substrates positioned in opposite to each other;

a sealant pattern, provided in a peripheral region, for bonding the first and second substrates to each other; and a liquid crystal layer formed between the first and second substrates.

* * * * *